United States Patent
Glimcher et al.

(10) Patent No.: US 11,494,096 B2
(45) Date of Patent: Nov. 8, 2022

(54) SYSTEM AND METHOD FOR STORAGE ARRAY ENCLOSURE DISCOVERY

(71) Applicant: EMC IP Holding Company, LLC, Hopkinton, MA (US)

(72) Inventors: Boris Glimcher, Bnei Brak (IL); Dmitry Krivenok, St. Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 217 days.

(21) Appl. No.: 16/887,134

(22) Filed: May 29, 2020

(65) Prior Publication Data

US 2021/0373786 A1    Dec. 2, 2021

(51) Int. Cl.
*G06F 3/06* (2006.01)
*H04L 101/622* (2022.01)

(52) U.S. Cl.
CPC ............ *G06F 3/0629* (2013.01); *G06F 3/067* (2013.01); *G06F 3/0617* (2013.01); *G06F 3/0649* (2013.01); *G06F 3/0688* (2013.01); *H04L 2101/622* (2022.05)

(58) Field of Classification Search
None
See application file for complete search history.

(56) References Cited

U.S. PATENT DOCUMENTS

| | | | | |
|---|---|---|---|---|
| 10,516,645 B1* | 12/2019 | Patel | ...................... | H04L 61/103 |
| 11,006,544 B1* | 5/2021 | McGraw | ............... | H05K 7/1498 |
| 2004/0049774 A1* | 3/2004 | Boyd | .................... | G06F 13/385 |
| | | | | 714/E11.078 |
| 2004/0190533 A1* | 9/2004 | Modi | .................. | H04L 49/9063 |
| | | | | 370/466 |
| 2006/0248191 A1* | 11/2006 | Hudson | ............... | H04L 67/1001 |
| | | | | 709/226 |
| 2020/0336808 A1* | 10/2020 | Menoher | ................. | H04L 63/10 |
| 2020/0409893 A1* | 12/2020 | Puttagunta | .............. | H04L 69/16 |

\* cited by examiner

*Primary Examiner* — Edward J Dudek, Jr.
*Assistant Examiner* — Ralph A Verderamo, III
(74) *Attorney, Agent, or Firm* — Brian J. Colandreo; Mark H. Whittenberger; Holland & Knight LLP (57) ABSTRACT

A method, computer program product, and computing system for generating one or more unique network addresses for one or more storage array enclosures of a storage system. The one or more unique network addresses may be advertised to one or more storage processors of the storage system. The one or more storage processors may be configured to communicate with a plurality of storage devices of the one or more storage array enclosures based upon, at least in part, the one or more unique network addresses of the one or more storage array enclosures.

17 Claims, 6 Drawing Sheets

SYSTEM AND METHOD FOR STORAGE ARRAY ENCLOSURE DISCOVERY

BACKGROUND

Storing and safeguarding electronic content may be beneficial in modern business and elsewhere. Accordingly, various methodologies may be employed to communicate data between storage processors and storage arrays more efficiently.

Storage devices of conventional directly attached storage array enclosures or expansion shelves may automatically be configured for communication with a storage processor. However, with non-volatile memory express over fabrics (NVMe-oF) expansion shelves (i.e., storage array enclosures that are communicatively coupled to storage processors via NVMe-oF protocol), storage devices may require advertisement and discovery via a network before communicating with a storage processor and as such may not be able to communicate with the storage processor. This challenge is enhanced when multiple storage array enclosures are coupled or chained together without being directly attached to a storage processor.

SUMMARY OF DISCLOSURE

In one example implementation, a computer-implemented method executed on a computing device may include but is not limited to generating one or more unique network addresses for one or more storage array enclosures of a storage system. The one or more unique network addresses may be advertised to one or more storage processors of the storage system. The one or more storage processors may be configured to communicate with a plurality of storage devices of the one or more storage array enclosures based upon, at least in part, the one or more unique network addresses of the one or more storage array enclosures.

One or more of the following example features may be included. The one or more storage array enclosures may include a plurality of non-volatile memory express (NVMe) drives. The one or more storage array enclosures may be communicatively coupled to the one or more storage processors via non-volatile memory express over fabric (NVMe-oF). Generating the one or more unique network addresses for the one or more storage array enclosures of a storage system may include generating the one or more unique network addresses for one or more storage controllers of the one or more storage array enclosures based upon, at least in part, a media access control (MAC) address associated with each storage controller. The one or more unique network addresses may include one or more Internet Protocol version 6 (IPv6) addresses.

Advertising the one or more unique network addresses to the one or more storage processors communicatively coupled to the storage system may include receiving, at the one or more storage array enclosures, one or more network address queries from the one or more storage processors; and responding, via the one or more storage array enclosures, to the one or more network address queries with the one or more unique network addresses generated for the one or more storage array enclosures.

Configuring the one or more storage processors to communicate with the plurality of storage devices of the one or more storage array enclosures based upon, at least in part, the one or more unique network addresses of the one or more storage array enclosures may include identifying, via the one or more storage processors, the plurality of storage devices of the one or more storage array enclosures based upon, at least in part, the one or more unique network addresses generated for the one or more storage array enclosures and configuring the one or more storage processors to communicate with the plurality of storage devices identified for the one or more storage array enclosures.

In another example implementation, a computer program product resides on a computer readable medium that has a plurality of instructions stored on it. When executed by a processor, the instructions cause the processor to perform operations that may include but are not limited to generating one or more unique network addresses for one or more storage array enclosures of a storage system. The one or more unique network addresses may be advertised to one or more storage processors of the storage system. The one or more storage processors may be configured to communicate with a plurality of storage devices of the one or more storage array enclosures based upon, at least in part, the one or more unique network addresses of the one or more storage array enclosures.

One or more of the following example features may be included. The one or more storage array enclosures may include a plurality of non-volatile memory express (NVMe) drives. The one or more storage array enclosures may be communicatively coupled to the one or more storage processors via non-volatile memory express over fabric (NVMe-oF). Generating the one or more unique network addresses for the one or more storage array enclosures of a storage system may include generating the one or more unique network addresses for one or more storage controllers of the one or more storage array enclosures based upon, at least in part, a media access control (MAC) address associated with each storage controller. The one or more unique network addresses may include one or more Internet Protocol version 6 (IPv6) addresses.

Advertising the one or more unique network addresses to the one or more storage processors communicatively coupled to the storage system may include receiving, at the one or more storage array enclosures, one or more network address queries from the one or more storage processors; and responding, via the one or more storage array enclosures, to the one or more network address queries with the one or more unique network addresses generated for the one or more storage array enclosures.

Configuring the one or more storage processors to communicate with the plurality of storage devices of the one or more storage array enclosures based upon, at least in part, the one or more unique network addresses of the one or more storage array enclosures may include identifying, via the one or more storage processors, the plurality of storage devices of the one or more storage array enclosures based upon, at least in part, the one or more unique network addresses generated for the one or more storage array enclosures and configuring the one or more storage processors to communicate with the plurality of storage devices identified for the one or more storage array enclosures.

In another example implementation, a computing system includes at least one processor and at least one memory architecture coupled with the at least one processor, wherein the at least one processor is configured to perform operations that may include but are not limited to generating one or more unique network addresses for one or more storage array enclosures of a storage system. The at least one processor may be configured to advertise the one or more unique network addresses to one or more storage processors of the storage system. The at least one processor may be further configured to configure the one or more storage processors to communicate with a plurality of storage devices of the one or more storage array enclosures based upon, at least in part, the one or more unique network addresses of the one or more storage array enclosures.

One or more of the following example features may be included. The one or more storage array enclosures may include a plurality of non-volatile memory express (NVMe) drives. The one or more storage array enclosures may be communicatively coupled to the one or more storage processors via non-volatile memory express over fabric (NVMe-oF). Generating the one or more unique network addresses for the one or more storage array enclosures of a storage system may include generating the one or more unique network addresses for one or more storage controllers of the one or more storage array enclosures based upon, at least in part, a media access control (MAC) address associated with each storage controller. The one or more unique network addresses may include one or more Internet Protocol version 6 (IPv6) addresses.

Advertising the one or more unique network addresses to the one or more storage processors communicatively coupled to the storage system may include receiving, at the one or more storage array enclosures, one or more network address queries from the one or more storage processors; and responding, via the one or more storage array enclosures, to the one or more network address queries with the one or more unique network addresses generated for the one or more storage array enclosures.

Configuring the one or more storage processors to communicate with the plurality of storage devices of the one or more storage array enclosures based upon, at least in part, the one or more unique network addresses of the one or more storage array enclosures may include identifying, via the one or more storage processors, the plurality of storage devices of the one or more storage array enclosures based upon, at least in part, the one or more unique network addresses generated for the one or more storage array enclosures and configuring the one or more storage processors to communicate with the plurality of storage devices identified for the one or more storage array enclosures.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
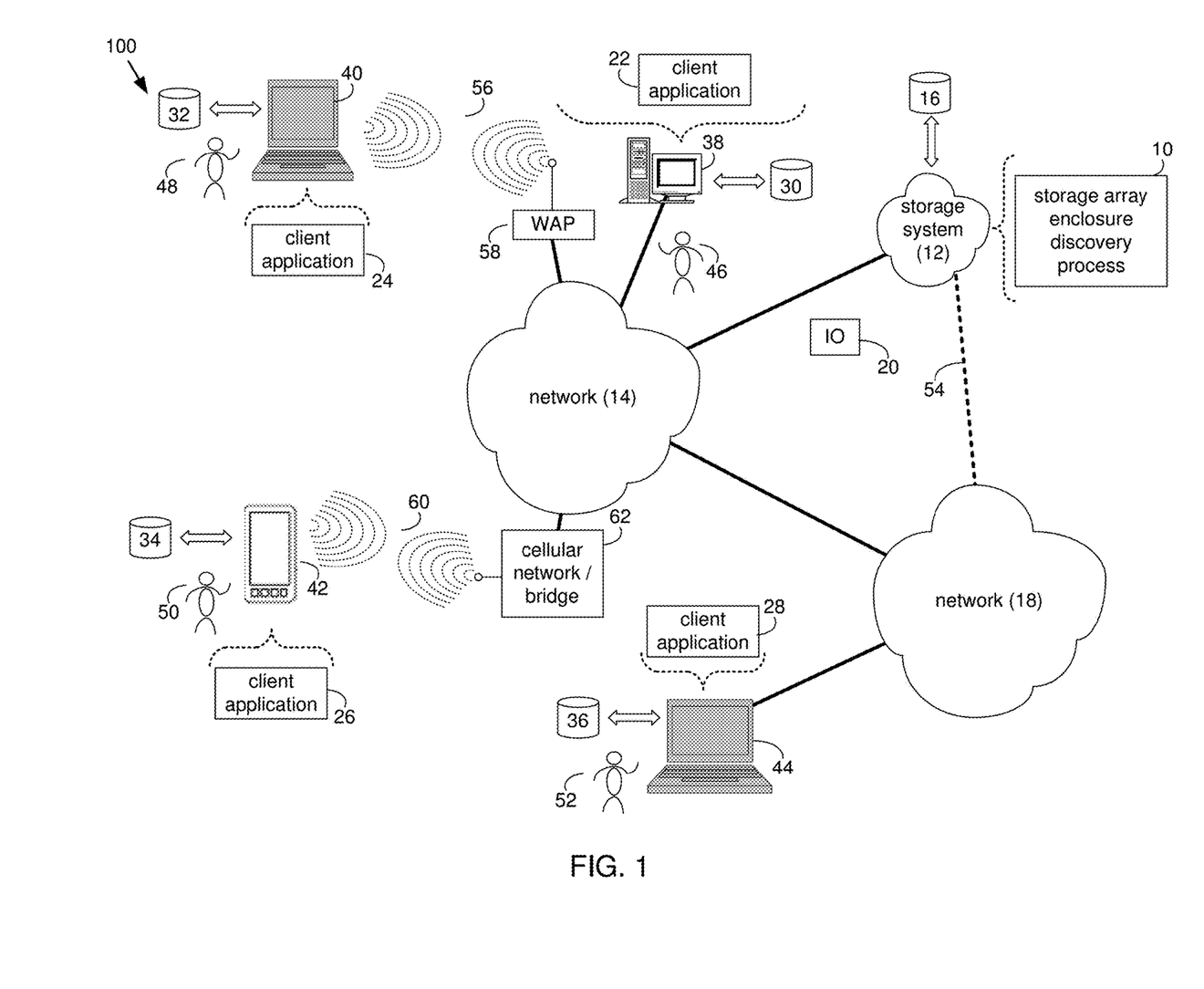
FIG. 1 is an example diagrammatic view of a storage system and a storage array enclosure discovery process coupled to a distributed computing network according to one or more example implementations of the disclosure.

System Overview:

Referring to FIG. 1, there is shown storage array enclosure discovery process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage array enclosure discovery process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices (e.g., Solid State memory storage devices). Additionally/alternatively, some portions of the instruction sets and subroutines of storage array enclosure discovery process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices (e.g., Solid State memory storage devices). Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as storage array enclosure discovery process 10 of FIG. 1, may include but is not limited to, receiving, via a storage processor of a storage system, a write request for writing a data portion to a storage array enclosure of non-volatile memory express (NVMe) drives communicatively coupled to the storage processor, where the write request may be received from a host. The data portion may be written to a persistent memory write cache within the storage array enclosure.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
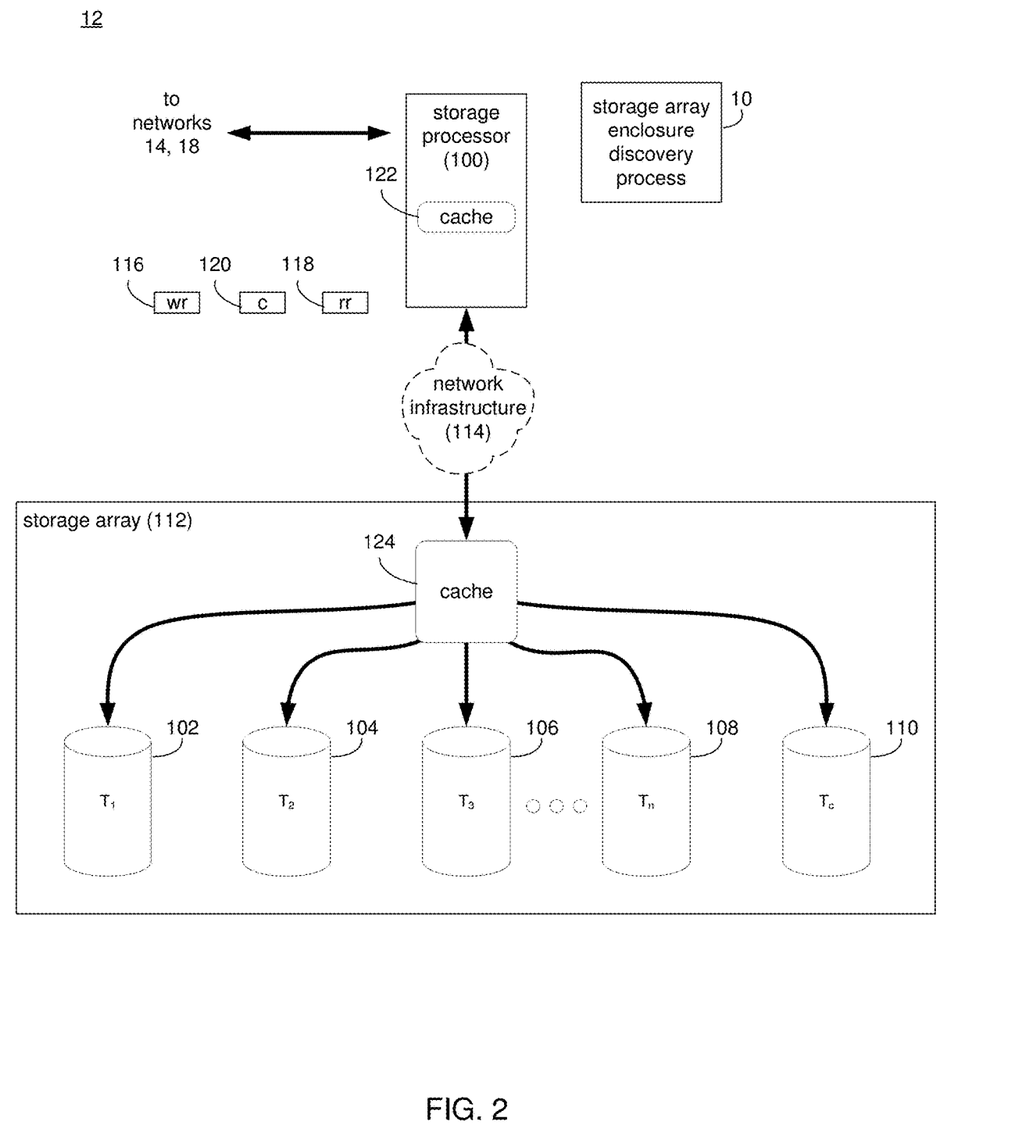
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-$n$ (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network. As will be discussed in greater detail below and in some implementations, network infrastructure 114 may include one or more storage fabrics. A storage fabric may generally include switches, routers, protocol bridges, gateway devices, and cables configured to connect components of storage system 12.

Storage system 12 may execute all or a portion of storage array enclosure discovery process 10. The instruction sets and subroutines of storage array enclosure discovery process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices (e.g., Solid State memory storage devices). As discussed above, some portions of the instruction sets and subroutines of storage array enclosure discovery process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 120 be written to storage system 12) and data read request 118 (i.e. a request that content 120 be read from storage system 12).

During operation of storage processor 100, content 120 to be written to storage system 12 may be processed by storage processor 100. Additionally/alternatively and when storage processor 100 is configured as an application server, content 120 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system or a non-volatile dual in-line memory module (NVDIMM-N)).

Storage processor 100 may initially store content 120 within frontend cache memory system 122. Depending upon the manner in which frontend cache memory system 122 is configured, storage processor 100 may immediately write content 120 to storage array 112 (if frontend cache memory system 122 is configured as a write-through cache) or may subsequently write content 120 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system or a NVDIMM-N system). During operation of storage array 112, content 120 to be written to storage array 112 may be received from storage processor 100. Storage array 112 may initially store content 120 within backend cache memory system 124 prior to being stored on e.g. one or more of storage targets 102, 104, 106, 108, and coded target 110.

As discussed above, the instruction sets and subroutines of storage array enclosure discovery process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage array enclosure discovery process 10 may be executed by one or more processors (not shown) and one or more memory architectures (not shown) included within storage array 112.

Further and as discussed above, during the operation of storage array 112, content (e.g., content 120) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In the context of storage systems, a storage processor (e.g., storage processor 100) may include one or more central processing units (CPUs) with one or more cores, a cache memory system (e.g., cache memory system 122), and one or more network interface cards (NICs). As discussed above and in some implementations, the storage processor (e.g., storage processor 100) may be communicatively coupled with a storage array (e.g., storage array 112). In some implementations, the storage array (e.g., storage array 112) may include one or more storage devices. In some implementations, the storage array may be a non-volatile memory disk array with one or more solid-state drives (SSDs). The storage processor 100 may interact with the one or more SSDs via the non-volatile memory express (NVMe) protocol or standard. NVMe is a trademark of NVM Express, Inc. in the United States, other countries, or both. In this manner, storage devices, such as SSDs, that are configured to communicate with a storage processor via the NVMe protocol may generally be referred to as NVMe devices.

As is known in the art, non-volatile memory express (NVMe) may generally include a host controller interface and storage protocol configured to transfer data between client systems and SSDs over a Peripheral Component Interconnect Express (PCIe) bus. Referring also to the example of FIG. 3 and in some implementations, one or more storage processors (e.g., storage processor 100 and storage processor 300) may be configured to be communicatively coupled to a storage array (e.g., storage array 112) via one or more storage fabrics (e.g., storage fabrics 302, 304). In some implementations, storage fabrics may be internal to storage system 12 and/or may be shared with clients (e.g., as shown in network 14 of FIG. 1). In this manner and as will be discussed in greater detail below, the storage system (e.g., storage system 12) may include a plurality of storage processors configured to receive a plurality of I/O requests (e.g., write requests, read requests, etc.).

Figure 3:
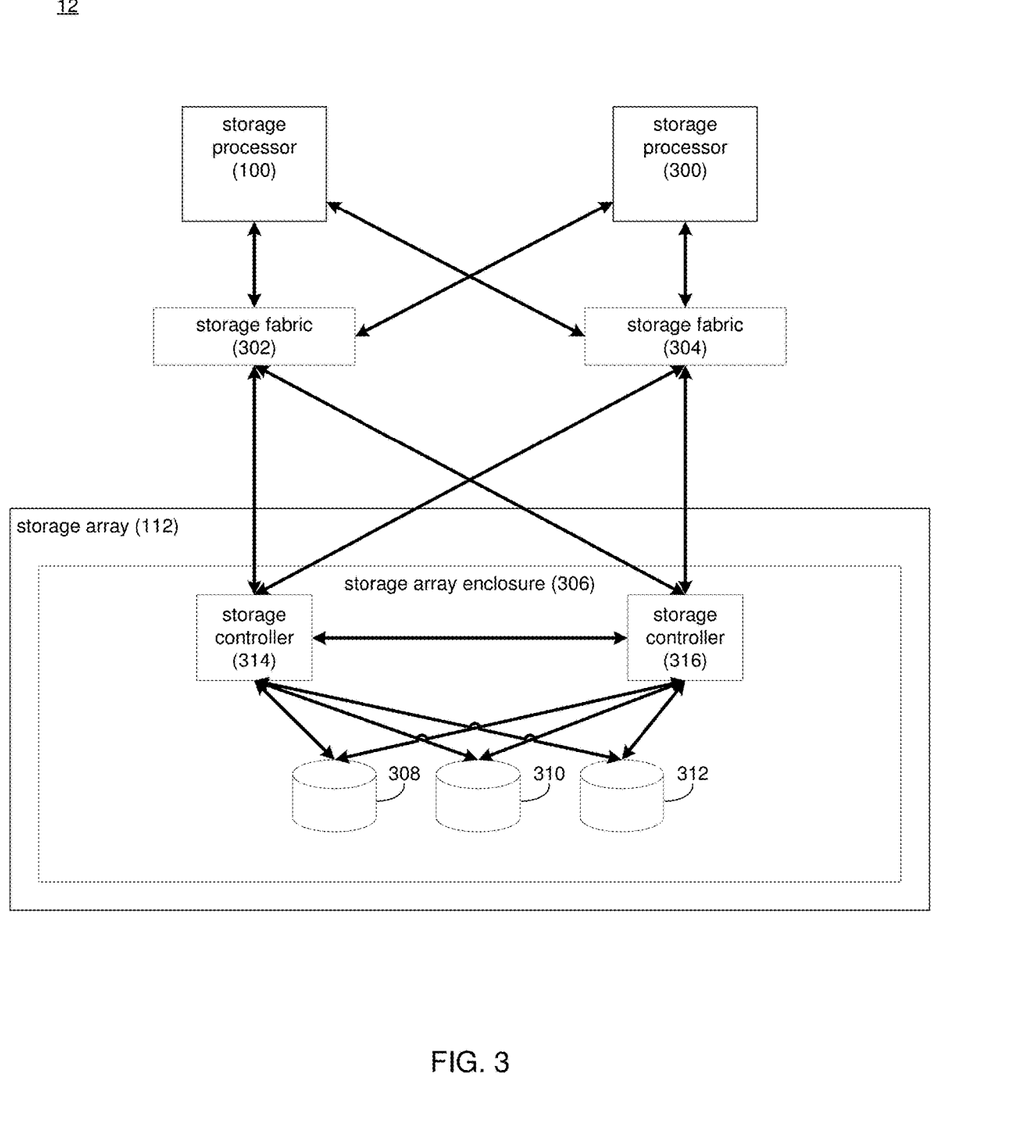

In some implementations, storage processors 100, 300 may be communicatively coupled with storage array 112 via a non-volatile memory express over fabrics protocol. NVMe-oF is a trademark of NVM Express, Inc. in the United States, other countries, or both. NVM Express over Fabrics (NVMe-oF) may generally define a common architecture that supports a range of storage networking fabrics for NVMe block storage protocol over a storage networking fabric. This includes enabling a front-side interface into storage systems, scaling out to large numbers of NVMe devices and extending the distance within a datacenter over which NVMe devices and NVMe subsystems can be accessed.

In some implementations, storage processors 100, 300 may be communicatively coupled to storage array 112 via one or more storage fabrics (e.g., storage fabrics 302, 304). In some implementations, storage fabric 302 may be a primary storage fabric while storage fabric 304 may be a high-availability or duplicate storage fabric in the event of a failure of storage fabric 302. In some implementations, storage fabrics 302, 304 may be used by storage processors 100, 300 to access storage array 112. While the example of FIG. 3 includes e.g., two storage fabrics, it will be appreciated that any number of storage fabrics may be used within the scope of the present disclosure to communicatively couple storage processors 100, 300 and storage array 112.

In some implementations, storage array 112 may include one or more storage array enclosures. In some implementations, a storage array enclosure (e.g., storage array enclosure 306) may generally include a drive carrier, one or more disk drives, a midplane, one or more storage controllers, and/or one or more persistent memory devices. In some implementations, the driver carrier of storage array enclosure 306 may be configured to hold one or more disk drives (e.g., NVMe drives 308, 310, 312). In some implementations, NVMe devices may include dual-ported NVMe devices configured to be communicatively coupled to two storage controllers. In this manner, failure of one storage controller may not impact access to each NVMe device. Storage array enclosure 306 may include a midplane configured to distribute power and signals to components within the storage array enclosure.

In some implementations, storage controllers (e.g., storage controllers 314, 316) may generally include a module configured to support, control, and monitor the storage array enclosure. In some implementations, storage controllers 314, 316 may include various input and/or output connectors for coupling one or more storage processors (e.g., storage processors 100, 300) to one or more disk drives (e.g., NVMe drives 308, 310, 312). In some implementations, storage array enclosure 306 may include dual controllers configured to provide access to the NVMe devices of storage array enclosure 306. In this manner, the dual controllers may provide no single point of failure for access to the NVMe devices of storage array 112.

Figure 4:
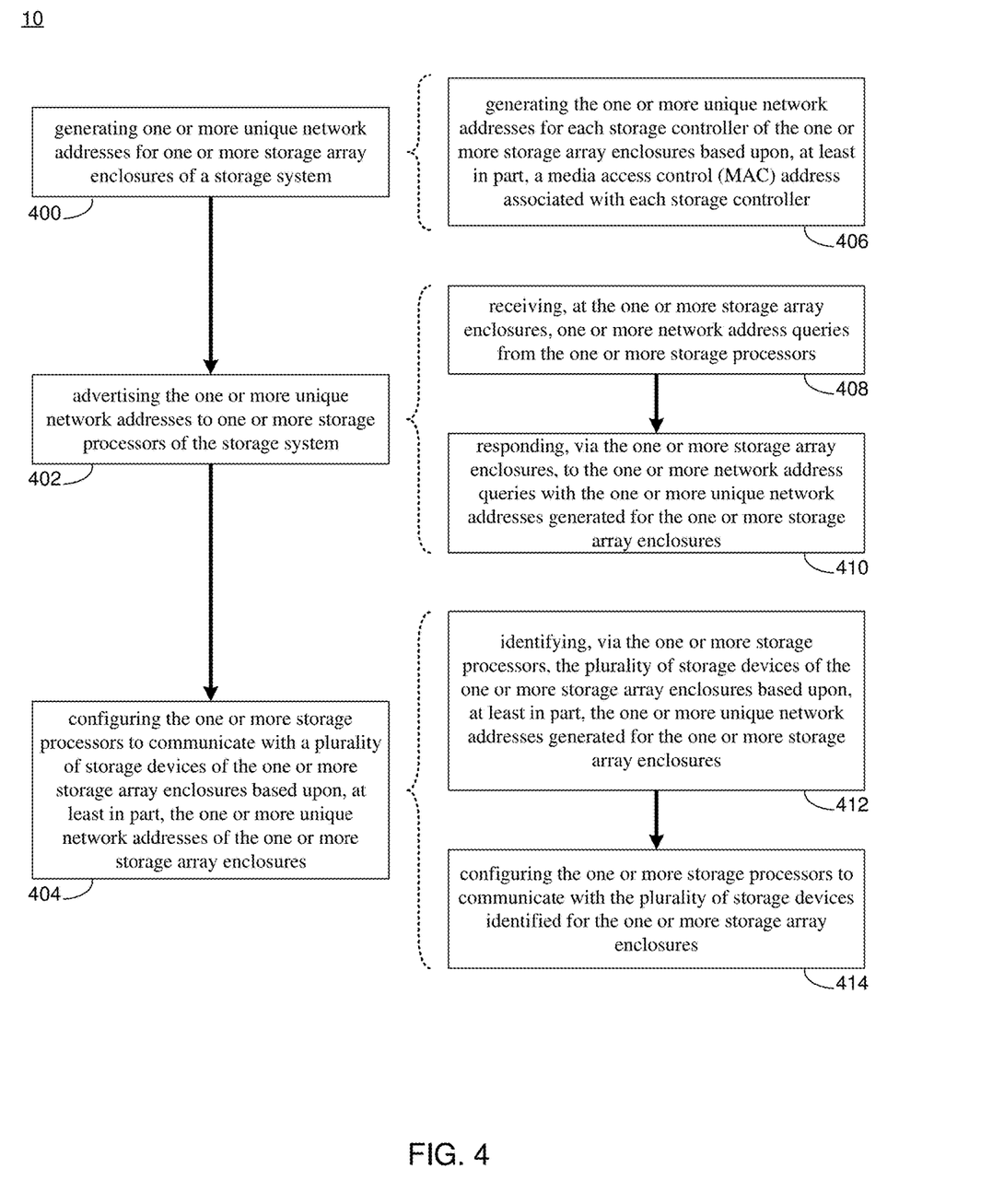
FIG. 4 is an example flowchart of the storage array enclosure discovery process of FIG. 1 according to one or more example implementations of the disclosure.

The Storage Array Enclosure Discovery Process:

Referring also to FIG. 4 and in some implementations, storage array enclosure discovery process 10 may generate 400 one or more unique network addresses for one or more storage array enclosures of a storage system. The one or more unique network addresses may be advertised 402 to one or more storage processors of the storage system. The one or more storage processors may be configured 404 to communicate with a plurality of storage devices of the one or more storage array enclosures based upon, at least in part, the one or more unique network addresses of the one or more storage array enclosures.

As will be discussed in greater detail below, implementations of the present disclosure may allow NVMe-oF storage array enclosures to be added to a storage system and the storage devices of the NVMe-oF storage array enclosures to be discovered and connected to storage processors of a storage system. For example, when connecting conventional directly attached storage array enclosures or expansion shelves (e.g., directly attached SAS or NVMe storage array enclosures), storage devices may automatically be configured for communication with a storage processor and can be monitored and used by RAID layers of the data path. However, with NVMe-oF expansion shelves (i.e., storage array enclosures that are communicatively coupled to storage processors via NVMe-oF), storage devices may require advertisement and discovery via a network before communicating with a storage processor. This challenge is enhanced when multiple storage array enclosures are coupled or chained together. As will be discussed in greater detail below, implementations of the present disclosure may allow discovery and configuration of storage devices of NVMe-oF expansion shelves/storage array enclosures with collision handling such that storage devices may automatically be configured for communication with storage processors of a storage system.

Referring also to the example of FIG. 3 and in some implementations, one or more storage array enclosures may be added to a storage system. As discussed above and in some implementations, a storage array enclosure may generally include a drive carrier, one or more disk drives, a midplane, one or more storage controllers, and/or one or more persistent memory devices. In some implementations, the one or more storage array enclosures may include a plurality of non-volatile memory express (NVMe) drives. As shown in the example of FIG. 3, the driver carrier of storage array enclosure 306 may be configured to hold one or more disk drives (e.g., NVMe drives 308, 310, 312). While an example of e.g., three disk drives has been provided for one storage array enclosure, it will be appreciated that any number of disk drives or other storage devices may be included within a storage array enclosure.

In some implementations, the one or more storage array enclosures may be communicatively coupled to the one or more storage processors via non-volatile memory express over fabric (NVMe-oF). Referring also to the example of FIG. 5 and in some implementations, suppose e.g., three storage array enclosures (e.g., storage array enclosures 306, 500, 502) are added to a storage system (e.g., storage system 12). In this example, each storage array enclosure (e.g., storage array enclosures 306, 500, 502) may include e.g., two storage controllers (e.g., storage controllers 314, 316 for storage array enclosure 306; storage controllers 504, 506 for storage array enclosure 500; and storage controllers 508, 510 for storage array enclosure 502). However, it will be appreciated that any number of storage array enclosures with any number of storage controllers may be used within the scope of the present disclosure.

Figure 5:
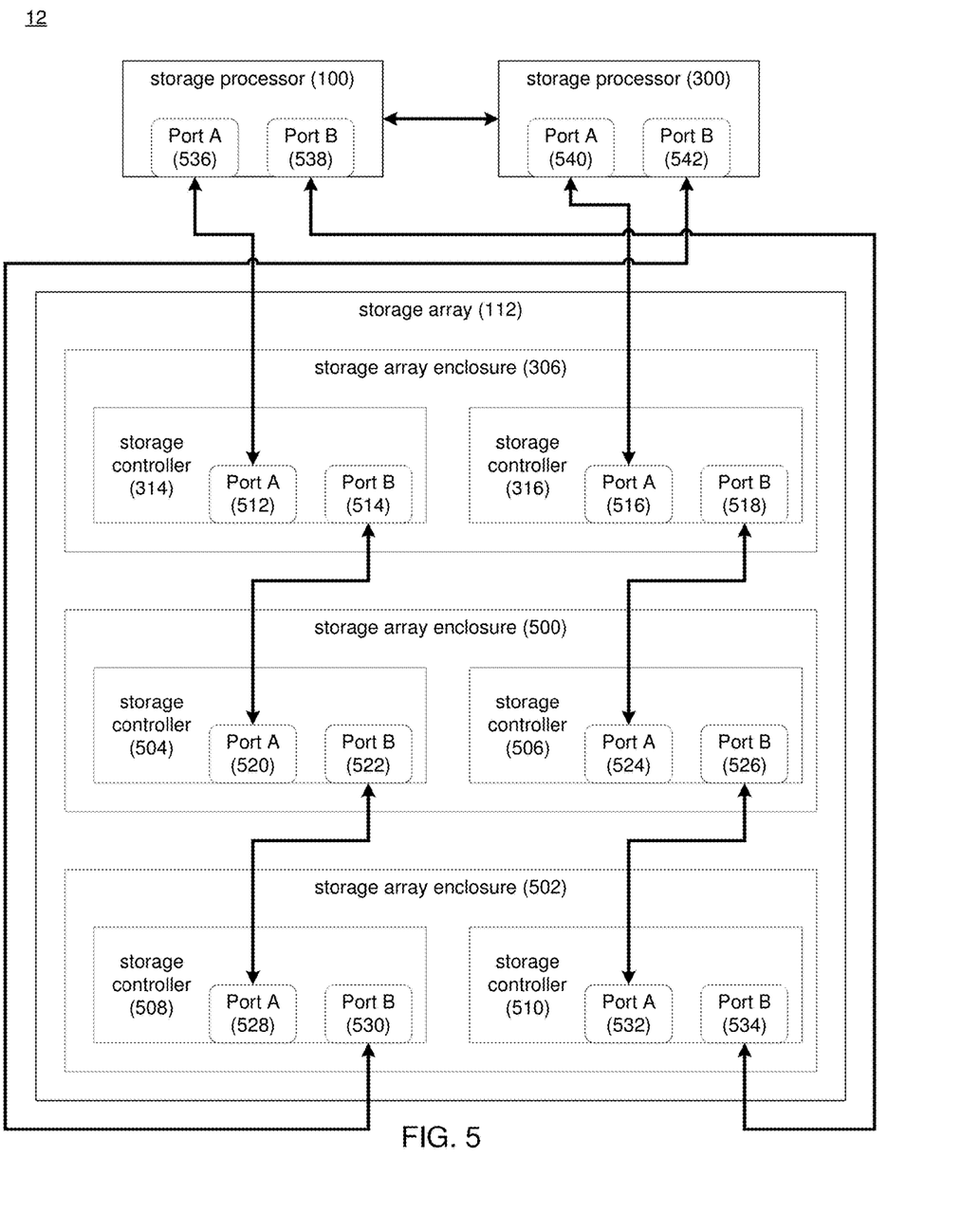
FIGS. 5-6 are example diagrammatic views of the storage system of FIG. 1 according to one or more example implementations of the disclosure.

In some implementations, each storage controller of a storage array enclosure (e.g., storage controllers 314, 316 for storage array enclosure 306; storage controllers 504, 506 for storage array enclosure 500; and storage controllers 508, 510 for storage array enclosure 502) may be communicatively coupled to or connected to a same set of storage devices. For example, in storage array enclosure 306, storage controllers 314 and 316 may be communicatively coupled to the same storage devices; in storage array enclosure 500, storage controllers 504 and 506 may be communicatively coupled to the same storage devices; and in storage array enclosure 502, storage controllers 508 and 510 may be communicatively coupled to the same storage devices. As discussed above and in some implementations, multiple storage controllers within a storage array enclosure may be configured to provide access to the same storage devices of the storage array enclosure. In this manner, multiple controllers may provide no single point of failure for access to the storage devices of the storage array enclosure.

In some implementations, each storage controller (e.g., storage controllers 314, 316, 504, 506, 508, 510) may include one or more network interface cards (NICs) for communicatively coupling with the one or more storage processors (e.g., storage processors 100, 300) within the storage system (e.g., storage system 12). For example, each storage controller (e.g., storage controllers 314, 316, 504, 506, 508, 510) may include a dual-port remote direct memory access (RDMA) network interface card (RNIC) to handle high bandwidth connectivity with RDMA capabilities to improve performance. In some implementations, switching may be accomplished e.g., via an L2 switch inside each RNIC between two ports based on MAC address rules. In the example of FIG. 5, storage controller 314 may include a dual-port RNIC (e.g., Port A 512 and Port B 514); storage controller 316 may include a dual-port RNIC (e.g., Port A 516 and Port B 518); storage controller 504 may include a dual-port RNIC (e.g., Port A 520 and Port B 522); storage controller 506 may include a dual-port RNIC (e.g., Port A 524 and Port B 526); storage controller 508 may include a dual-port RNIC (e.g., Port A 528 and Port B 530); and storage controller 510 may include a dual-port RNIC (e.g., Port A 532 and Port B 534).

In some implementations, the one or more storage array enclosures (e.g., storage array enclosures 306, 500, 502) may be communicatively coupled to the one or more storage processors (e.g., storage processors 100, 300) via NVMe-oF. For example and as shown in FIG. 5, suppose storage processor 100 includes a dual-port RNIC (e.g., Port A 536 and Port B 538) and storage processor 300 includes a dual-port RNIC (e.g., Port A 540 and Port B 542). In this example, storage processor 100 may be communicatively coupled (e.g., via Ethernet using NVMe-oF protocols) to storage array enclosure 306 (e.g., Port A 536 of storage processor 100 may be communicatively coupled to Port A 512 of storage controller 314 of storage array enclosure 306) and storage array enclosure 502 (e.g., Port B 538 of storage processor 100 may be communicatively coupled to Port B 534 of storage controller 510 of storage array enclosure 502).

As shown in the example of FIG. 5, storage processor 300 may be communicatively coupled (e.g., via Ethernet using NVMe-oF protocols) to storage array enclosure 306 (e.g., Port A 540 of storage processor 300 may be communicatively coupled to Port A 516 of storage controller 316 of storage array enclosure 306) and storage array enclosure 502 (e.g., Port B 542 of storage processor 300 may be communicatively coupled to Port B 530 of storage controller 508 of storage array enclosure 502).

Continuing with the above example, storage array enclosure 306 may be coupled to or chained to storage array enclosure 500 (e.g., Port B 514 of storage controller 314 of storage array enclosure 306 may be communicatively coupled to Port A 520 of storage controller 504 of storage array enclosure 500 and Port B 518 of storage controller 316 of storage array enclosure 306 may be communicatively coupled to Port A 524 of storage controller 506 of storage array enclosure 500).

In this example, storage array enclosure 500 may be coupled to or chained to storage array enclosure 502 (e.g., Port B 522 of storage controller 504 of storage array enclosure 500 may be communicatively coupled to Port A 528 of storage controller 508 of storage array enclosure 502 and Port B 526 of storage controller 506 of storage array enclosure 500 may be communicatively coupled to Port A 532 of storage controller 510 of storage array enclosure 502). In this manner, each storage array enclosure may be communicatively coupled to the one or more storage processors either by direct attachment or by chaining to another storage array enclosure that is directly attached to the one or more storage processors. While an example arrangement of connections between storage array enclosures and storage processors has been described, it will be appreciated that any configuration for coupling storage array enclosures and storage processors may be used within the scope of the present disclosure.

In some implementations, storage array enclosure discovery process 10 may generate 400 one or more unique network addresses for one or more storage array enclosures of a storage system. As discussed above and in some implementations, storage devices of NVMe-oF expansion shelves (i.e., storage array enclosures that are communicatively coupled to storage processors via NVMe-oF) may require advertisement and discovery via a network before communicating with a storage processor. As shown in the example of FIG. 5, this challenge may be enhanced when multiple storage array enclosures are coupled or chained together (e.g., storage array enclosure 500 is not directly attached to a storage processor). Accordingly, storage array enclosure discovery process 10 may allow the storage devices of storage array enclosure 500 to be identified by storage processors 100 and 300 such that storage processors 100 and 300 may be configured to communicate with the storage devices of storage array enclosure 500 even though storage array enclosure 500 is not directly attached to either storage processor.

In some implementations, a unique network address may generally include a network address that uniquely references a specific storage array enclosure. In some implementations, the unique network address may identify a particular port of a storage controller of a storage array enclosure. For example, storage array enclosure discovery process 10 may generate 400 a unique network address for each port of each storage controller of each storage array enclosure.

Referring again to the example of FIG. 5 and in some implementations, storage array enclosure discovery process 10 may generate 400 unique network identifiers for Port A 512 and Port B 514 of storage controller 314 and Port A 516 and Port B 518 of storage controller 316 of storage array enclosure 306; for Port A 520 and Port B 522 of storage controller 504 and Port A 524 and Port B 526 of storage controller 506 of storage array enclosure 500; and for Port A 528 and Port B 530 of storage controller 508 and Port A 532 and Port B 534 of storage controller 510 of storage array enclosure 502. In this manner, each port of each storage controller of each storage array enclosure may have a unique network address. As discussed above and in some implementations, the ports of a storage controller may be ports of a network interface card of a storage controller (e.g., ports of a dual-port RDMA network interface card (RNIC)).

In some implementations, the one or more unique network addresses may include one or more Internet Protocol (IP) addresses. As is known in the art, an IP address is part of the Internet Protocol communications protocol that provides an identification and location system for computers on networks and routes traffic across the Internet. In some implementations, IP addresses may generally include version 4 (IPv4) addresses and version 6 (IPv6) addresses. While examples of IPv4 and IPv6 will be discussed below, it will be appreciated that any unique network address protocol may be used within the scope of the present disclosure.

In some implementations, storage array enclosure discovery process 10 may generate an IPv6 address for each port of one or more storage controllers of one or more storage array enclosures. In some implementations, storage array enclosure discovery process 10 may generate 406 a unique local address (ULA) IPv6 fixed address on each port of each storage controller of each storage array enclosure based upon, at least in part, a media access control (MAC) address associated with each storage controller. As is known in the art, a unique local address (ULA) may generally include an Internet Protocol version 6 (IPv6) address in the address range fc00::/7 for private network addressing. In some implementations, unique local addresses (ULAs) may be used freely, without centralized registration, inside a single site or organization or spanning a limited number of sites or organizations.

In some implementations, generating 400 the one or more unique network addresses for the one or more storage array enclosures of a storage system may include generating 406 the one or more unique network addresses for one or more storage controllers of the one or more storage array enclosures based upon, at least in part, a media access control (MAC) address associated with each storage controller. In some implementations, a ULA IPv6 address may include a predefined prefix. In some implementations, the predefined prefix may be generated based upon, at least in part a media access control (MAC) address associated with each storage controller. A MAC address may generally include a unique identifier assigned to a network interface controller for use as a network address in communications within a network segment. In some implementations, a MAC address may be predefined or pre-assigned to each RNIC of each storage controller of each storage array enclosure.

In some implementations, when storage array enclosures (e.g., storage array enclosures 306, 500, 502) are added to a storage system (e.g., storage system 12), storage array enclosure discovery process 10 may generate 406 ULA IPv6 fixed addresses for each port (e.g., Port A 512 and/or Port B 514 of storage controller 314 and/or Port A 516 and/or Port B 518 of storage controller 316 of storage array enclosure 306; for Port A 520 and/or Port B 522 of storage controller 504 and/or Port A 524 and/or Port B 526 of storage controller 506 of storage array enclosure 500; and/or for Port A 528 and/or Port B 530 of storage controller 508 and/or Port A 532 and/or Port B 534 of storage controller 510 of storage array enclosure 502) based on MAC addresses of each RNIC of each storage controller of each storage array enclosure. In some implementations, storage array enclosure discovery process 10 may generate 406 the one or more unique network addresses as ULA IPv6 addresses with a predefined prefix, (e.g., fd00:de11:de11:de11) or a prefix generated by storage array enclosure discovery process 10 according to the rules described in Request for Comments (RFC) 4193. In some implementations, the same prefix may be used for each storage array enclosure.

In some implementations, a 64-bit IPv6 interface identifier may be generated 406 by storage array enclosure discovery process 10 based upon, at least in part, a e.g., 48-bit MAC address as explained above using standard mEUI-64 encoding. The advantage of this approach may be that it is stateless and may not require the persistence on the storage array enclosure. However, if persistence is available for a storage array enclosure, then interface identifiers may be generated only once and persisted for future use. In this case, if portions of a storage array enclosure are replaced, then generated unique network addresses may not change. In some implementations, this may be useful where it is undesirable for storage processors to constantly discover the unique network addresses for one or more storage array enclosures (e.g., for each port of each storage controller of each storage array enclosure).

In some implementations, ULA IPv6 addressing may be compatible with direct connection (Ethernet host chaining) and connection via backend Ethernet switches. Accordingly, the ULA IPv6 addresses generated 400 by storage array enclosure discovery process 10 may be globally unique such that there may not be any IP address conflicts in the network when a storage processor accesses storage array enclosure via a backend Ethernet switch.

In some implementations, storage array enclosure discovery process 10 may advertise 402 the one or more unique network addresses to one or more storage processors of the storage system. In some implementations and in response to generating 400 the one or more unique network addresses for the one or more storage array enclosures, one or more storage processors may seek to connect to storage devices of the one or more storage array enclosures. However, and as discussed above, NVMe-oF may generally require the discovery and configuration of NVMe drives over a network. In some implementations, as the storage processors of a storage system may be unable to automatically discover and configure storage devices from storage array enclosures communicatively coupled to the one or more storage processors via NVMe-oF, storage array enclosure discovery process 10 may advertise 402, via the one or more storage controllers of the one or more storage array enclosures, the one or more unique network addresses of the one or more storage array enclosures. In this manner, the one or more storage processors may be able to address the one or more storage array enclosures to discover and communicate with storage devices of each storage array enclosure.

In some implementations, advertising 402 the one or more unique network addresses to the one or more storage processors communicatively coupled to the storage system may include receiving 408, at the one or more storage array enclosures, one or more network address queries from the one or more storage processors. In some implementations, storage array enclosure discovery process 10 may, via the one or more storage processors, utilize the Simple Service Discovery Protocol (SSDP) to provide one or more network address queries to the one or more storage array enclosures.

As is known in the art, SSDP is a network protocol based on the Internet protocol suite for advertisement and discovery of network services and presence information. In some implementations, storage array enclosure discovery process 10 may, via the one or more storage processors, send one or more network address queries to the one or more storage array enclosures. In one example, a network address query may include an "M-SEARCH" network address query of the SSDP. As is known in the art, an M-SEARCH network address query may generally include a multicast request configured to search a network for devices.

For example, storage array enclosure discovery process 10 may, via storage processors 100 and/or 300, send one or more network address queries to the one or more storage array enclosures (e.g., storage array enclosures 306, 500, 502). In this example, storage controllers 314 and 316 of storage array enclosure 306 and storage controllers 508 and 510 of storage array enclosure 502 may receive 408 the one or more network address queries from storage processors 100 and/or 300.

In some implementations, advertising 402 the one or more unique network addresses to the one or more storage processors communicatively coupled to the storage system may include responding 410, via the one or more storage array enclosures, to the one or more network address queries with the one or more unique network addresses generated for the one or more storage array enclosures. In some implementations, one or more storage controllers (e.g., storage controllers 314, 316, 504, 506, 508, 510) may be configured to run a SSDP server configured to respond 410 to the one or more network address queries (e.g., one or more M-SEARCH queries) with the one or more unique network addresses generated for the one or more storage array enclosures (e.g., each IPv6 address). In this manner, storage array enclosure discovery process 10 may advertise 402 the one or more unique network addresses to the one or more storage processors communicatively coupled to the storage system.

In some implementations, storage array enclosure discovery process 10 may periodically advertise 402 the one or more unique network addresses to the one or more storage processors communicatively coupled to the storage system. For example, storage array enclosure discovery process 10 may, via the one or more storage processors, periodically transmit the one or more network address queries to the one or more storage array enclosures. In some implementations, the rate for periodically transmitting the one or more network address queries may be user-defined (e.g., via a user interface) and/or automatically defined (e.g., as a default and/or defined by storage array enclosure discovery process 10). In some implementations, the periodically sent queries may address the dynamic nature of a backend network as storage array enclosures may be added, removed, serviced, and/or replaced, etc. at various times.

In some implementations, advertising 402 the one or more unique network addresses to the one or more storage processors communicatively coupled to the storage system may include transmitting, via the one or more storage controllers of the one or more storage array enclosures, one or more network address notifications. For example and in some implementations, storage array enclosure discovery process 10 may, via the one or more storage controllers of the one or more storage array enclosures, transmit the one or more unique network addresses generated for the one or more storage array enclosures. Referring again to the example of FIG. 5 and in some implementations, the one or more storage controllers (e.g., storage controllers 314, 316, 504, 506, 508, 510) of the one or more storage array enclosures (e.g., storage array enclosures 306, 500, 502) may be configured to send a network address notification (e.g., one or more SSDP "NOTIFY" packets) to advertise their existence on the network (e.g., the network formed by storage processors 100, 300 and storage array enclosures 306, 500, 502).

Figure 6:
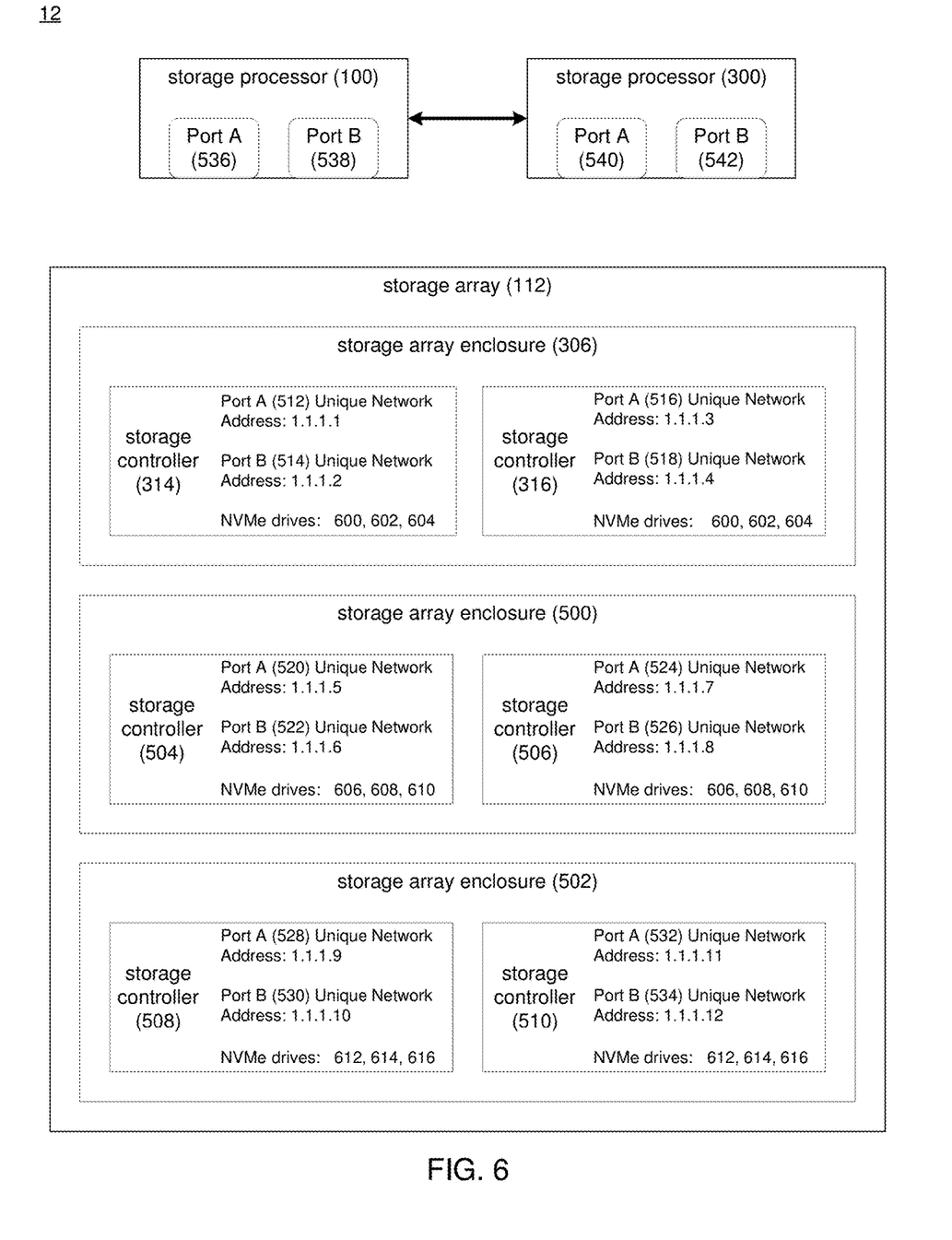

Referring also to the example of FIG. 6 and in some implementations, storage array enclosure discovery process 10 may identify 412, via the one or more storage processors (e.g., storage processors 100, 300), the plurality of storage devices of the one or more storage array enclosures (e.g., storage array enclosures 306, 500, 502) based upon, at least in part, the one or more unique network addresses generated for the one or more storage array enclosures. For example, suppose storage array enclosure discovery process 10 generates 400 unique network addresses for each port of one or more storage controllers of one or more storage array enclosures. In this example, storage array enclosure discovery process 10 may generate a unique network address of e.g., 1.1.1.1 for Port A 512 and e.g., 1.1.1.2 for Port B 514 of storage controller 314 and a unique network address of e.g., 1.1.1.3 for Port A 516 and e.g., 1.1.1.4 for Port B 518 of storage controller 316 of storage array enclosure 306.

Similarly, storage array enclosure discovery process 10 may generate 400 a unique network address of e.g., 1.1.1.5 for Port A 520 and e.g., 1.1.1.6 for Port B 522 of storage controller 504 and a unique network address of e.g., 1.1.1.7 for Port A 524 and e.g., 1.1.1.8 for Port B 526 of storage controller 506 of storage array enclosure 500. In this example, storage array enclosure discovery process 10 may generate 400 a unique network address of e.g., 1.1.1.9 for Port A 528 and e.g., 1.1.1.10 for Port B 530 of storage controller 508 and a unique network address of e.g., 1.1.1.11 for Port A 532 and e.g., 1.1.1.12 for Port B 534 of storage controller 510 of storage array enclosure 502. While example unique network addresses have been provided for each port, it will be appreciated that any unique network address may be generated 400 for the one or more storage array enclosures within the scope of the present disclosure.

Continuing with the above example and as discussed above, further suppose storage array enclosure discovery process 10 advertises 402 the one or more unique network addresses to the one or more storage processors communicatively coupled to the storage system. In this example, storage array enclosure discovery process 10 may advertise 402 the one or more unique network address of storage array enclosures 306, 500, 502 to storage processors 100, 300.

In some implementations, storage array enclosure discovery process 10 may configure 404 the one or more storage processors to communicate with a plurality of storage devices of the one or more storage array enclosures based upon, at least in part, the one or more unique network addresses of the one or more storage array enclosures. In some implementations, when the one or more unique network addresses for the one or more storage array enclosures are provided to the one or more storage processors (i.e., in response to advertising 402 the one or more unique network addresses), storage array enclosure discovery process 10 may configure 404 the one or more storage processors to initiate NVMe-oF discovery and connect. In some implementations and in order to discover NVMe-oF drives of a storage array enclosure, storage array enclosure discovery process 10 may configure NVMe-oF on each storage array enclosure according to the unique network address (e.g., the IPv6 address) generated during booting of the storage array enclosure (e.g., during booting of the storage controller(s) of the storage array enclosure).

In some implementations, configuring 404 the one or more storage processors to communicate with the plurality of storage devices of the one or more storage array enclosures based upon, at least in part, the one or more unique network addresses of the one or more storage array enclosures may include identifying 412, via the one or more storage processors, the plurality of storage devices of the one or more storage array enclosures based upon, at least in part, the one or more unique network addresses generated for the one or more storage array enclosures. In some implementations per NVMe-oF protocol and as will be discussed in greater detail below, discovery controllers of each storage array enclosure may be configured to receive and respond to discovery queries from a storage processor. For example, the one or more storage processors may send a discovery query/command to one or more storage array enclosures according to the one or more unique network addresses (e.g., a discovery command addressed to each IPv6 address generated for each port of each storage controller of each storage array enclosure). An example of a discovery query/command per NVMe-oF is provided below:

nvme discover −t rdma −a 1.1.1.1 −s 4420
Discovery Log Number of Records 1, Generation counter 1
=====Discovery Log Entry 0=====
trtype: rdma
adrfam: ipv4
subtype: nvme subsystem
treq: not specified
portid: 1
trsvcid: 4420
subnqn: testsubsystem
traddr: 1.1.1.1
rdma_prtype: not specified
rdma_qptype: connected
rdma_cms: rdma-cm
rdma_pkey: 0x0000

In some implementations and as discussed above, a discovery controller of a storage array enclosure may be configured to receive and respond to discovery queries/commands sent from the one or more storage processors. In some implementations, storage array enclosure discovery process 10 may identify 412 the plurality of storage devices of the one or more storage array enclosures based upon, at least in part, the one or more unique network addresses generated for the one or more storage array enclosures. For example, in response to the discovery query/command, storage array enclosure discovery process 10 may, via the discovery controller(s) of the one or more storage array enclosures, respond with a list of one or more subsystems (e.g., storage devices) of the one or more storage array enclosures.

Continuing with the above example of FIG. 6, in response to the advertising 402 of the one or more unique network addresses of the one or more storage array enclosures (e.g., storage array enclosures 306, 500, 502), storage array enclosure discovery process 10 may configure 404 the one or more storage processors (e.g., storage processors 100, 300) to communicate with the plurality of storage devices of the one or more storage array enclosures (e.g., storage array enclosures 306, 500, 502) based upon, at least in part, the one or more unique network addresses of the one or more storage array enclosures. For example and as discussed above, storage array enclosure discovery process 10 may, via the one or more storage processors (e.g., storage processors 100, 300), send a discovery query/command to one or more storage array enclosures (e.g., storage array enclosures 306, 500, 502) according to the one or more unique network addresses generated for each storage array enclosure (e.g., storage array enclosures 306, 500, 502).

In some implementations, storage array enclosure discovery process 10 may send a discovery query/command to each unique network address advertised by the one or more storage array enclosures. For example, storage array enclosure discovery process 10 may, via storage processors 100, 300, send a discover query/command to Port A 512 (e.g., via unique network address 1.1.1.1) and/or Port B 514 (e.g., via unique network address 1.1.1.2) of storage controller 314 and/or Port A 516 (e.g., via unique network address 1.1.1.3) and/or Port B 518 (e.g., via unique network address 1.1.1.4) of storage controller 316 of storage array enclosure 306.

Continuing with the above example and in some implementations, storage array enclosure discovery process 10 may, via storage processors 100 and/or 300, send a discover query/command to Port A 520 (e.g., via unique network address 1.1.1.5) and/or Port B 522 (e.g., via unique network address 1.1.1.6) of storage controller 504 and/or Port A 524 (e.g., via unique network address 1.1.1.7) and/or Port B 526 (e.g., via unique network address 1.1.1.8) of storage controller 506 of storage array enclosure 500.

In some implementations, storage array enclosure discovery process 10 may, via storage processors 100, 300, send a discover query/command to Port A 528 (e.g., via unique network address 1.1.1.9) and/or Port B 30 (e.g., via unique network address 1.1.1.10) of storage controller 508 and/or Port A 532 (e.g., via unique network address 1.1.1.11) and/or Port B 534 (e.g., via unique network address 1.1.1.12) of storage controller 510 of storage array enclosure 502.

In some implementations, configuring 404 the one or more storage processors to communicate with the plurality of storage devices of the one or more storage array enclosures based upon, at least in part, the one or more unique network addresses of the one or more storage array enclosures may include configuring 414 the one or more storage processors to communicate with the plurality of storage devices identified for the one or more storage array enclosures. In some implementations, storage array enclosure discovery process 10 may, via the one or more storage array enclosures, respond to the discovery queries/commands from the one or more storage processors with a list of subsystems and/or storage devices of the one or more storage array enclosures.

In some implementations, with the list of subsystems and/or storage devices of the one or more storage array enclosures, storage array enclosure discovery process 10 may, via the one or more storage processors, send connect commands to the storage devices of the one or more storage array enclosures, including the storage array enclosures not directly attached to the one or more storage processors (e.g., the storage array enclosures chained to other storage array enclosures that are directly attached to the one or more storage processors). As discussed above and in some implementations, the connect commands may be NVMe-oF connect commands. However, it will be appreciated that other connect commands of other storage protocols may be used within the scope of the present disclosure. An example of connect commands that may be sent from the one or more storage processors to the one or more storage array enclosures to configure the one or more storage processors to communicate with the plurality of storage devices of the one or more storage array enclosures is provided below:

for i in $(seq 1 10);
do
nvme connect −t rdma −n testsubsystem$i −a 1.1.1.1 −s 4420
done In some implementations, storage array enclosure discovery process 10 may configure 404 the one or more storage processors to communicate with the plurality of storage devices of the one or more storage array enclosures. Referring again to the above example of FIG. 6 and in some implementations, in response to the discovery queries/commands sent to the one or more storage array enclosures (e.g., to each unique network address of the ports of the one or more storage controllers of the one or more storage array enclosures), storage array enclosure discovery process 10 may, via the one or more storage processors (e.g., storage processors 100, 300), identify 412 the storage devices of the one or more storage array enclosures. For example, storage array enclosure discovery process 10 may identify 412 a plurality of storage devices (e.g., NVMe drives 600, 602, 604) of storage array enclosure 306 in response to the discovery queries/commands received by storage controllers 314 and/or 316 (e.g., via Port A 512, Port B 514, Port A 516, and/or Port B 518).

In some implementations, storage array enclosure discovery process 10 may identify 412 a plurality of storage devices (e.g., NVMe drives 606, 608, 610) of storage array enclosure 500 in response to the discovery queries/commands received by storage controllers 504 and/or 506 (e.g., via Port A 520, Port B 522, Port A 524, and/or Port B 526). In some implementations, storage array enclosure discovery process 10 may identify 412 a plurality of storage devices (e.g., NVMe drives 612, 614, 616) of storage array enclosure 502 in response to the discovery queries/commands received by storage controllers 508 and/or 510 (e.g., via Port A 528, Port B 530, Port A 532, and/or Port B 534). While examples have been provided of discover queries/commands being provided to specific ports of specific storage controllers, it will be appreciated that discovery queries/commands may be provided in any configuration to various ports of various storage controllers within the scope of the present disclosure.

Continuing with the above example and in some implementations, storage array enclosure discovery process 10 may configure 414 the one or more storage processors to communicate with the plurality of storage devices identified for the one or more storage array enclosures. For example, storage array enclosure discovery process 10 may configure 414 storage processors 100 and 300 to communicate with the plurality of storage devices (e.g., NVMe drives 600, 602, and 604) of storage array enclosure 306; the plurality of storage devices (e.g., NVMe drives 606, 608, and 610) of storage array enclosure 500; and/or the plurality of storage devices (e.g., NVMe drives 612, 614, and 616) of storage array enclosure 502 identified 412 by storage array enclosure discovery process 10 using the one or more unique network addresses.

In some implementations, storage array enclosure discovery process 10 may utilize IPv4 addresses for identifying 412 the plurality of storage devices of the one or more storage array enclosures based upon, at least in part, the one or more unique network addresses generated for the one or more storage array enclosures. For example, storage array enclosure discovery process 10 may assign one or more pre-allocated IPv4 addresses from a range of reserved IPv4 addresses to the ports of the one or more storage controllers of the one or more storage array enclosures. In some implementations, storage array enclosure discovery process 10 may, via the one or more storage processors, assign an allocated IPv4 address to a port of a storage controller of a storage array enclosure using the unique network address (e.g., the IPv6 address generated 400 for the port of the storage controller of the storage array enclosure). For example, the assigned IPv4 address may be provided to and/or assigned to the storage array enclosure via the secure shell (SSH) protocol over IPv6. In this manner, storage array enclosure discovery process 10 may utilize NVMe discover and connect protocols using the IPv4 addresses instead of IPv6 addresses.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a storage system, comprising:
    generating, via the storage system, one or more unique network addresses for one or more storage array enclosures of the storage system, wherein each of storage array enclosures of the one or more storage array enclosures includes one or more storage controllers, wherein generating the one or more unique network addresses includes:
        generating a fixed Internet Protocol (IP) address based upon a media access control (MAC) address associated with a remote direct memory access (RDMA) network interface card (RNIC), wherein each storage controller of one or more storage controllers includes the RNIC;
    advertising the one or more unique network addresses to one or more storage processors of the storage system; and
    configuring the one or more storage processors to communicate with a plurality of storage devices of the one or more storage array enclosures based upon, at least in part, the one or more unique network addresses of the one or more storage array enclosures.

2. The computer-implemented method of claim 1, wherein the one or more storage array enclosures include a plurality of non-volatile memory express (NVMe) drives.

3. The computer-implemented method of claim 2, wherein the one or more storage array enclosures are communicatively coupled to the one or more storage processors via non-volatile memory express over fabric (NVMe-oF).

4. The computer-implemented method of claim 1, wherein the one or more unique network addresses include one or more Internet Protocol version 6 (IPv6) addresses.

5. The computer-implemented method of claim 1, wherein advertising the one or more unique network addresses to the one or more storage processors communicatively coupled to the storage system includes:
    receiving, at the one or more storage array enclosures, one or more network address queries from the one or more storage processors; and
    responding, via the one or more storage array enclosures, to the one or more network address queries with the one or more unique network addresses generated for the one or more storage array enclosures.

6. The computer-implemented method of claim 5, wherein configuring the one or more storage processors to communicate with the plurality of storage devices of the one or more storage array enclosures based upon, at least in part, the one or more unique network addresses of the one or more storage array enclosures includes:
    identifying, via the one or more storage processors, the plurality of storage devices of the one or more storage array enclosures based upon, at least in part, the one or more unique network addresses generated for the one or more storage array enclosures; and
    configuring the one or more storage processors to communicate with the plurality of storage devices identified for the one or more storage array enclosures.

7. A computer program product residing on a non-transitory computer readable medium having a plurality of instructions stored thereon which, when executed by a processor, cause the processor to perform operations comprising:

generating one or more unique network addresses for one or more storage array enclosures of a storage system, wherein each of storage array enclosures of the one or more storage array enclosures includes one or more storage controllers, wherein generating the one or more unique network addresses includes:

generating a fixed Internet Protocol (IP) address based upon a media access control (MAC) address associated with a remote direct memory access (RDMA) network interface card (RNIC), wherein each storage controller of one or more storage controllers includes the RNIC;

advertising the one or more unique network addresses to one or more storage processors of the storage system; and configuring the one or more storage processors to communicate with a plurality of storage devices of the one or more storage array enclosures based upon, at least in part, the one or more unique network addresses of the one or more storage array enclosures.

8. The computer program product of claim 7, wherein the one or more storage array enclosures include a plurality of non-volatile memory express (NVMe) drives.

9. The computer program product of claim 8, wherein the one or more storage array enclosures are communicatively coupled to the one or more storage processors via non-volatile memory express over fabric (NVMe-oF).

10. The computer program product of claim 7, wherein the one or more unique network addresses include one or more Internet Protocol version 6 (IPv6) addresses.

11. The computer program product of claim 7, wherein advertising the one or more unique network addresses to the one or more storage processors communicatively coupled to the storage system includes:

receiving, at the one or more storage array enclosures, one or more network address queries from the one or more storage processors; and responding, via the one or more storage array enclosures, to the one or more network address queries with the one or more unique network addresses generated for the one or more storage array enclosures.

12. The computer program product of claim 11, wherein configuring the one or more storage processors to communicate with the plurality of storage devices of the one or more storage array enclosures based upon, at least in part, the one or more unique network addresses of the one or more storage array enclosures includes:

identifying, via the one or more storage processors, the plurality of storage devices of the one or more storage array enclosures based upon, at least in part, the one or more unique network addresses generated for the one or more storage array enclosures; and configuring the one or more storage processors to communicate with the plurality of storage devices identified for the one or more storage array enclosures.

13. A computing system comprising:

a memory; and a processor configured to generate one or more unique network addresses for one or more storage array enclosures of a storage system, wherein each of storage array enclosures of the one or more storage array enclosures includes one or more storage controllers, wherein generating the one or more unique network addresses includes generating a fixed Internet Protocol (IP) address based upon a media access control (MAC) address associated with a remote direct memory access (RDMA) network interface card (RNIC), wherein each storage controller of one or more storage controllers includes the RNIC, wherein the processor is further configured to advertise the one or more unique network addresses to one or more storage processors of the storage system, and wherein the processor is further configured to configure the one or more storage processors to communicate with a plurality of storage devices of the one or more storage array enclosures based upon, at least in part, the one or more unique network addresses of the one or more storage array enclosures.

14. The computing system of claim 13, wherein the one or more storage array enclosures include a plurality of non-volatile memory express (NVMe) drives.

15. The computing system of claim 14, wherein the one or more storage array enclosures are communicatively coupled to the one or more storage processors via non-volatile memory express over fabric (NVMe-oF).

16. The computing system of claim 13, wherein the one or more unique network addresses include one or more Internet Protocol version 6 (IPv6) addresses.

17. The computing system of claim 13, wherein advertising the one or more unique network addresses to the one or more storage processors communicatively coupled to the storage system includes:

receiving, at the one or more storage array enclosures, one or more network address queries from the one or more storage processors; and responding, via the one or more storage array enclosures, to the one or more network address queries with the one or more unique network addresses generated for the one or more storage array enclosures.

* * * * *